(12) United States Patent
Lee (10) Patent No.: US 12,489,290 B2
(45) Date of Patent: Dec. 2, 2025

(54) ELECTRO-STATIC DISCHARGE (ESD) PROTECTION CIRCUIT AND ELECTRONIC DEVICE INCLUDING ESD PROTECTION CIRCUIT

(71) Applicant: SK hynix Inc., Icheon-si (KR)

(72) Inventor: Seung Ho Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 137 days.

(21) Appl. No.: 18/419,968

(22) Filed: Jan. 23, 2024

(65) Prior Publication Data

US 2025/0038525 A1 Jan. 30, 2025

(30) Foreign Application Priority Data

Jul. 24, 2023 (KR) ........................ 10-2023-0096425

(51) Int. Cl.
*H02H 9/04* (2006.01)

(52) U.S. Cl.
CPC ................................... *H02H 9/046* (2013.01)

(58) Field of Classification Search
CPC .... H02H 9/046; H02H 1/0007; H10D 89/811; H10D 89/911; H10D 89/931
USPC ........................................................ 361/56
See application file for complete search history.

(56) References Cited

U.S. PATENT DOCUMENTS

| | | | | |
|---|---|---|---|---|
| 6,469,560 B1 * | 10/2002 | Chang | ................. | H10D 89/811 327/310 |
| 6,621,679 B1 * | 9/2003 | Segervall | ............ | H10D 89/819 361/111 |
| 6,867,957 B1 * | 3/2005 | Tong | ................... | H10D 89/811 361/111 |
| 9,025,289 B1 * | 5/2015 | Peng | ...................... | H02H 9/046 361/118 |
| 9,293,912 B2 * | 3/2016 | Parthasarathy | ......... | H02H 9/04 |
| 11,025,054 B2 * | 6/2021 | Ting | ...................... | H02H 9/046 |
| 11,355,927 B2 * | 6/2022 | Peng | .................... | H10D 89/819 |
| 11,710,962 B2 * | 7/2023 | Peng | .................... | H10D 89/819 361/56 |
| 2002/0167054 A1 * | 11/2002 | Chang | ................. | H10D 89/811 257/360 |
| 2006/0050452 A1 * | 3/2006 | Oguzman | ........... | H10D 89/601 361/56 |
| 2007/0177317 A1 * | 8/2007 | Kim | ..................... | H10D 89/811 361/56 |
| 2007/0205800 A1 * | 9/2007 | Ker | ..................... | H10D 89/811 326/21 |

(Continued)

FOREIGN PATENT DOCUMENTS

| | | | | |
|---|---|---|---|---|
| CN | 103219718 A | * | 7/2013 | ............. H10D 84/00 |
| CN | 107403796 B | * | 2/2020 | ........... H10D 89/911 |

(Continued)

*Primary Examiner* — Dharti H Patel
(74) *Attorney, Agent, or Firm* — WILLIAM PARK AND ASSOCIATES LTD.

(57) ABSTRACT

An electro-static discharge (ESD) protection circuit includes an ESD current discharge circuit including a first transistor, a second transistor, and a third transistor, connected in series and connected between a pad and a ground voltage, an ESD detection circuit configured to turn on the third transistor when the ESD event occurs, and a bias generation circuit configured to provide a bias voltage for turning on the first transistor to a gate of the first transistor when the ESD event occurs.

20 Claims, 5 Drawing Sheets

(56) References Cited

U.S. PATENT DOCUMENTS

| | | | | |
|---|---|---|---|---|
| 2008/0055805 A1* | 3/2008 | Pong | ................... | H10D 89/819 |
| | | | | 361/56 |
| 2011/0194218 A1* | 8/2011 | Chen | ..................... | H02H 9/046 |
| | | | | 361/56 |
| 2018/0301898 A1* | 10/2018 | Hsu | ....................... | H02H 9/046 |
| 2019/0173278 A1* | 6/2019 | Jang | ................... | H10D 89/811 |

FOREIGN PATENT DOCUMENTS

| | | | | |
|---|---|---|---|---|
| KR | 100852575 B1 * | 8/2008 | ........... | H10D 89/819 |
| KR | 1020170044357 A | 4/2017 | | |

* cited by examiner

ELECTRO-STATIC DISCHARGE (ESD) PROTECTION CIRCUIT AND ELECTRONIC DEVICE INCLUDING ESD PROTECTION CIRCUIT

CROSS-REFERENCE TO RELATED APPLICATIONS

The present application claims priority under 35 U.S.C. 119(a) to Korean Patent Application No. 10-2023-0096425, filed on Jul. 24, 2023, in the Korean Intellectual Property Office, which is incorporated herein by reference in its entirety.

BACKGROUND

1. Technical Field

Embodiments of the present disclosure relate to an electro-static discharge (ESD) protection circuit and an electronic device including an ESD protection circuit.

2. Related Art

Recent system on chip (SoC) devices require a high-speed interface circuit that requires low power supply voltage and high-speed operation. To this end, a triple gate oxide (TGO) process using a MOS transistor having a thin gate insulating layer for a relatively low core voltage operation and MOS transistors having thick gate insulating layers of two different thicknesses for a relatively high input/output voltage operation has been applied. However, with the recent introduction of micro-processing for semiconductor devices, a dual gate oxide (DGO) process is being applied instead of the triple gate oxide (TGO) process, which has a very complex manufacturing process. That is, as devices constituting an operating circuit, a MOS transistor having a thin gate insulating layer for the core voltage operation and a MOS transistor having a thick gate insulating layer for the input/output voltage operation are used. For example, when applying a process of 28 nm or less, a MOS transistor including a thin gate insulating layer for 1.8 V operation and a MOS transistor including a thick gate insulating layer for 2.5 V or 3.3 V operation are used.

However, when an electro-static discharge (ESD) protection circuit is implemented using MOS transistors, a voltage that is two or three times higher than the operation voltage may be applied to the terminals of the MOS transistors. In such a case, a reliability problem may occur with the MOS transistor. Moreover, a method of using parasitic bipolar junction transistors in MOS transistors has been used as a mechanism for ESD protection operations so far. Recently, when applying a process of 7 nm or less, a method of discharging the ESD current through the channels of the MOS transistors is adopted instead of turning on the parasitic bipolar junction transistors. Accordingly, there is a need to solve the reliability problem of the MOS transistors constituting an ESD protection circuit when an ESD event occurs.

SUMMARY

An electrostatic discharge (ESD) protection circuit according to an embodiment of the present disclosure may include an ESD current discharge circuit including a first transistor, a second transistor, and a third transistor, connected in series and connected between a pad and a ground voltage, an ESD detection circuit configured to turn on the third transistor when the ESD event occurs, and a bias generation circuit configured to provide a bias voltage for turning on the first transistor to a gate of the first transistor when the ESD event occurs.

An electronic device according to an embodiment of the present disclosure may include a pad, an internal circuit coupled to the pad, and an electro-static discharge (ESD) protection circuit configured to protect the internal circuit when an ESD event in which an ESD current flows into the pad occurs. The ESD protection circuit may include an ESD current discharge circuit including a first transistor, a second transistor, and a third transistor that are connected in series to each other and connected between the pad and a ground voltage, and a bias generation circuit configured to provide a bias voltage for turning on the first transistor to a gate of the first transistor when the ESD event occurs.

DETAILED DESCRIPTION

In the following descriptions of embodiments, it should be understood that the terms "first" and "second" are intended to identify elements, but not used to define a particular number or sequence of elements. In addition, when an element is referred to as being located "on," "over," "above," "under," or "beneath" another element, it is intended to mean relative positional relationship, but not used to limit certain cases for which the element directly contacts the other element, or at least one intervening element is present between the two elements. Accordingly, the terms such as "on," "over," "above," "under," "beneath," "below," and the like that are used herein are for the purpose of describing particular embodiments only and are not intended to limit the scope of the present disclosure.

Further, when an element is referred to as being "connected" or "coupled" to another element, the element may be electrically or mechanically connected or coupled to the other element directly, or may be electrically or mechanically connected or coupled to the other element indirectly with one or more additional elements between the two elements. Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed.

A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage may correspond to a signal having a logic "low" level. In an embodiment, the logic "high" level may be set as a voltage level which is higher than a voltage level of the logic "low" level. Meanwhile, logic levels of signals may be set to be different or opposite according to embodiment. For example, a certain signal having a logic "high" level in one embodiment may be set to have a logic "low" level in another embodiment.

Various embodiments of the present disclosure will be described hereinafter in detail with reference to the accompanying drawings. However, the embodiments described herein are for illustrative purposes only and are not intended to limit the scope of the present disclosure.

As used herein, "ESD" means electro-static discharge. The magnitude of an electro-static discharge that can or will damage an integrated circuit will depend on various factors including but not limited to the construction, material and packaging of an integrated circuit itself.

Figure 1:
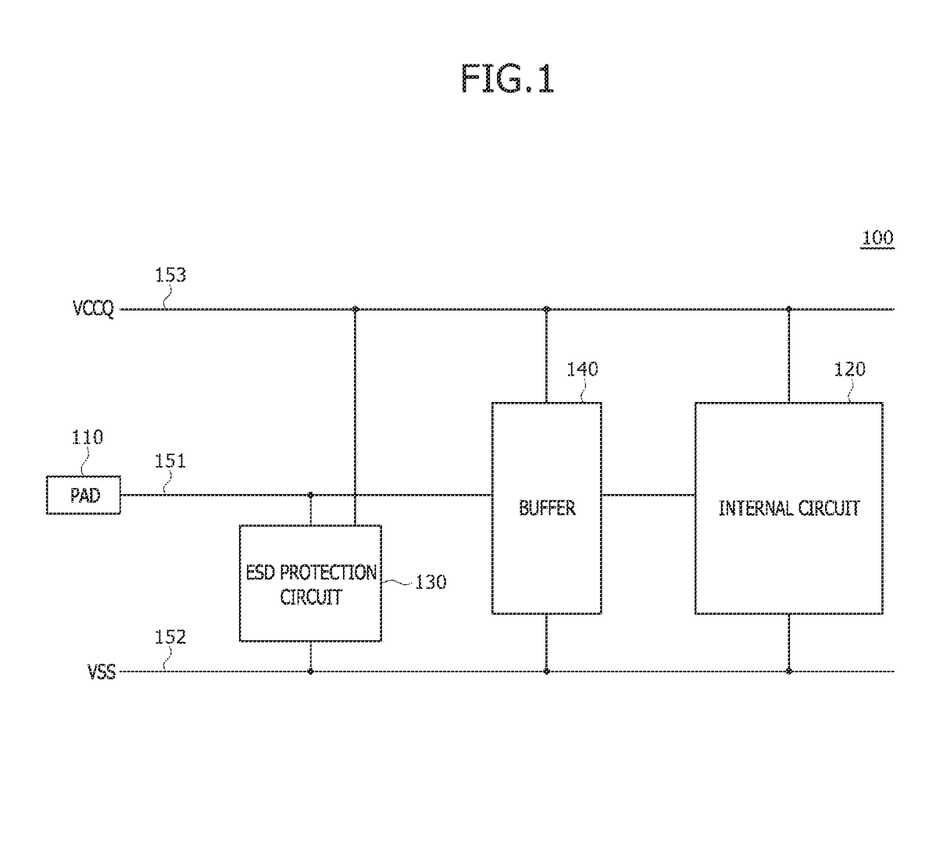
FIG. 1 is a block diagram illustrating an electronic device including an electro-static discharge (ESD) protection circuit according to an embodiment of the present disclosure.

FIG. 1 is a block diagram illustrating an electronic device 100 including an electro-static discharge (ESD) protection circuit 130 according to an embodiment of the present disclosure.

Referring to FIG. 1, the electronic device 100 may include a pad 110, an internal circuit 120, and the ESD protection circuit 130. The electronic device 100 may further include a buffer 140. The pad 110 may allow the electronic device 100 to be electrically coupled to an external circuit, such as one or more other integrated circuits. That is, the electronic device 100 may receive signals from an external circuit through the pad 110. The electronic device 100 may also transmit signals to an external circuit through the pad 11. The pad 110 may also be coupled to a first voltage line 151.

The internal circuit 120 may perform various types of operations and functions, and may comprise logic devices and circuits, analog devices and circuits, and other types of devices and circuits. The internal circuit 120 may comprise transistors, diodes, pre-amplifiers, operational amplifiers, buffers, inverters, and/or other circuits. In addition, the internal circuit 120 may include a level-shifter adapted to convert a voltage signal in a certain range into a voltage signal in another range. In addition, the internal circuit 120 may include a signal amplification circuit. The internal circuit 120 may include volatile memory cells such as DRAM cells or non-volatile memory cells such as NAND cells or NOR cells.

The internal circuit 120 may be coupled to a second voltage line 152 and a third voltage line 153. A ground voltage or other magnitude reference potential voltage VSS is applied to the second voltage line 152. A power supply voltage VCCQ is applied to the third voltage line 153.

The internal circuit 120 may be electrically coupled to the buffer 140. In an embodiment, the buffer 140 may include a pull-up circuit or driver as well as a pull-down circuit or driver as input and output circuits of the buffer 140.

The buffer 140 may be coupled to the pad 110 through the first voltage line 151. A signal transmitted from outside the device 100 through the pad 110 may be transmitted to the internal circuit 120 through the first voltage line 151 and the buffer 140. A signal output from the internal circuit 120 may also be transmitted to the outside of the device 100 through the buffer 140, the first voltage line 151, and the pad 110.

The ESD protection circuit 130 may be located to be coupled to the first voltage line 151, the second voltage line 152, and the third voltage line 153. When an ESD event in which an ESD current flows into the pad 110 occurs, the ESD protection circuit 130 may discharge the ESD current to the second voltage line 152 or the third voltage line 153, thereby preventing damage to the internal circuit 120 due to the ESD event. Accordingly, the ESD protection circuit 130 may need a fast triggering function to perform the ESD protection operation before the ESD current flows into the internal circuit 120. In addition, the ESD protection circuit 130 may need to be designed to withstand a high ESD voltage until the ESD current is sufficiently discharged. Additionally, the ESD protection circuit 130 may need to be designed not to affect signals transmitted between the pad 110 and the internal circuit 120 while the internal circuit 120 is operating normally.

Figure 2:
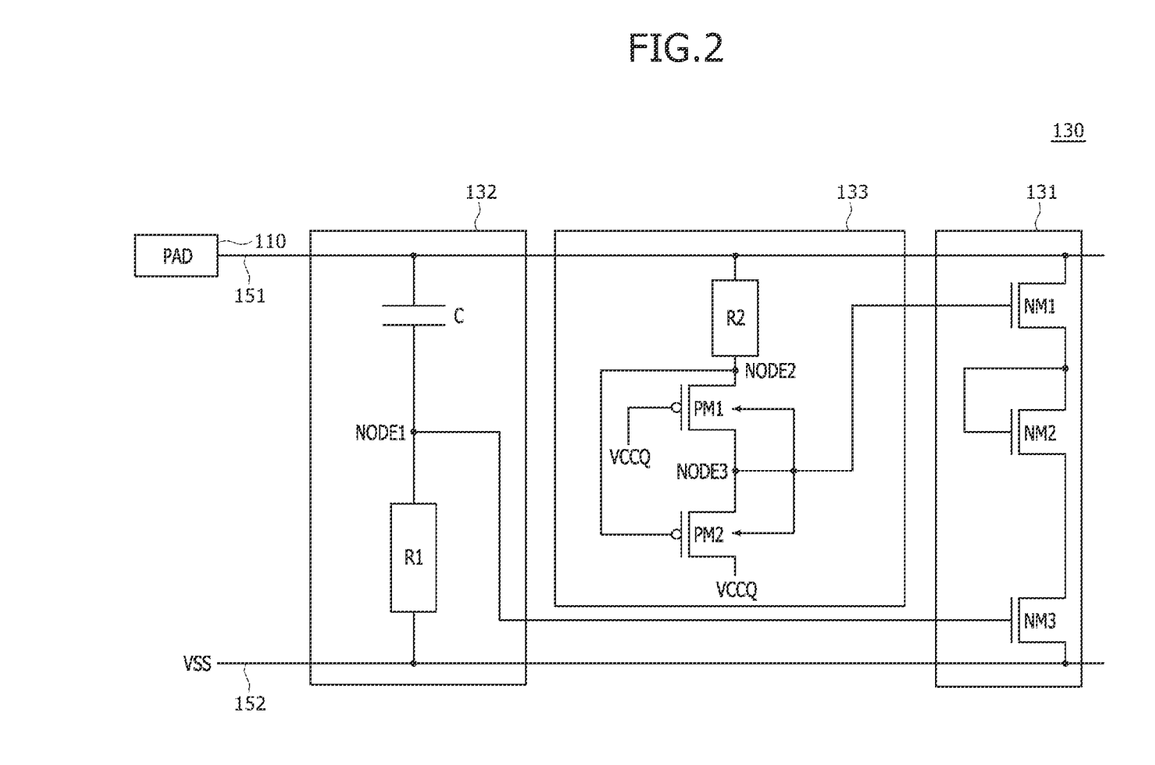
FIG. 2 is a circuit diagram illustrating an ESD protection circuit according to an embodiment of the present disclosure.

FIG. 2 is a circuit diagram illustrating an electro-static discharge (ESD) protection circuit 130 according to an embodiment of the present disclosure. Referring to FIG. 2, the ESD protection circuit 130 may include an ESD current discharge circuit 131, an ESD detection circuit 132, and a bias generation circuit 133. As described with reference to FIG. 1, when an ESD event occurs, the ESD protection circuit 130 may protect the internal circuit (120 in FIG. 1) from the ESD.

The ESD current discharge circuit 131 may be coupled to the pad 110 through the first voltage line 151 and coupled to the ground voltage VSS through the second voltage line 152. The ESD current discharge circuit 131 may include a first transistor NM1, a second transistor NM2, and a third transistor NM3, which are connected in series as shown in FIG. 2 and connected across or between the first voltage line 151 and the second voltage line 152. Each of the first transistor NM1, the second transistor NM2, and the third transistor NM3 may be composed of an N-channel type MOS (NMOS) transistor. Hereinafter, the first transistor NM1, the second transistor NM2, and the third transistor NM3 may be referred to as a first N-channel type MOS (NMOS) transistor NM1, a second NMOS transistor NM2, and a third NMOS transistor NM3 respectively. When an ESD event occurs by which a large, i.e., destructive positive voltage is introduced onto first voltage line 151 through the pad 110, the ESD current caused by that positive voltage may be shunted to ground or the second voltage line 152, i.e., discharged from the pad 110 to the ground voltage VSS, through channels of the series-connected first NMOS transistor NM1, the second NMOS transistor NM2, and the third NMOS transistor NM3. Similarly, when a large negative (i.e., less than ground potential) is introduced onto first voltage line 151 such that the electric potential of the first voltage line 151 precipitously drops below the electric potential of the second voltage line 152, destructive current drawn from the second voltage line 152 can be shunted from the second voltage line 152 to the first voltage line 151, i.e., in an opposite path.

As shown in FIG. 2, the drain of the first NMOS transistor NM1 may be coupled to the pad 110 through the first voltage line 151. A source of the first NMOS transistor NM1 may be coupled to a drain of the second NMOS transistor NM2. A source of the second NMOS transistor NM2 may be coupled to a drain of the third NMOS transistor NM3. A source of the third NMOS transistor NM3 may be coupled to the ground voltage VSS through the second voltage line 152. A gate of the first NMOS transistor NM1 may be coupled to the bias generation circuit 133. A gate of the second NMOS transistor NM2 may be coupled to the drain of the second NMOS transistor NM2 and the source of the first NMOS transistor NM1. A gate of the third NMOS transistor NM3 may be coupled to the ESD detection circuit 132.

The second NMOS transistor NM2 may be configured to provide a diode-connected MOSFET in which the gate and drain are directly connected to each other. Accordingly, the gate and drain of the second NMOS transistor NM2 may be coupled to the source of the first NMOS transistor NM1 in common. A source voltage of the first NMOS transistor NM1 may be commonly applied to the gate and drain of the second NMOS transistor NM2, and a gate-source voltage and a drain-source voltage of the second NMOS transistor NM2 may be increased or decreased together. Accordingly, the drain-source voltage of the second NMOS transistor NM2 may always be greater than a value obtained by subtracting a threshold voltage of the second NMOS transistor NM2 from the gate-source voltage of the second NMOS transistor NM2, and as a result, the second NMOS transistor NM2 may always operate in a saturation region. The second NMOS transistor NM2 may be turned on at a point in time when the gate-source voltage of the second NMOS transistor NM2 becomes greater than the threshold voltage of the second NMOS transistor NM2. To this end, the first NMOS transistor NM1 needs to be turned on to increase the source voltage of the first NMOS transistor NM1. That is, the second NMOS transistor NM2 may be turned on in a state in which the first NMOS transistor NM1 is turned on and the gate voltage and drain voltage of the second NMOS transistor NM2 are increased.

The ESD detection circuit 132 may include a capacitor C and a first resistor R1. The capacitor C is connected between the first voltage line 151 and a first node NODE1. The first resistor R1 is connected between the first node NODE1 and the second voltage line 152. One electrode of the capacitor C may be coupled to the pad 110 through the first voltage line 151. The other electrode of the capacitor C may be coupled to the first node NODE1. One terminal of the first resistor R1 may be coupled to the first node NODE1. The other terminal of the first resistor R1 may be coupled to the ground voltage VSS through the second voltage line 152. The first node NODE1 of the ESD detection circuit 132 may be coupled to the gate of the third NMOS transistor NM3 of the ESD current discharge circuit 131.

The bias generation circuit 133 may include a second resistor R2 connected between the first voltage line 151 and a second node NODE2, a fourth transistor PM1 connected between the second node NODE2 and a third node NODE3, and a fifth transistor PM2 coupled to the third node NODE3 and the power supply voltage VCCQ. One terminal of the second resistor R2 may be coupled to the first voltage line 151. The other terminal of the second resistor R2 may be coupled to the second node NODE2. Each of the fourth transistor PM1 and the fifth transistor PM2 may be composed of a P-channel type MOS (PMOS) transistor. Hereinafter, the fourth transistor PM1 and the fifth transistor PM2 will be referred to as a first PMOS transistor PM1 and a second PMOS transistor PM2, respectively.

A source of the first PMOS transistor PM1 may be coupled to the second node NODE2. A drain of the first PMOS transistor PM1 may be coupled to the third node NODE3. A gate of the first PMOS transistor PM1 may be coupled to the power supply voltage VCCQ. A drain of the second PMOS transistor PM2 may be coupled to the third NODE node3. A source of the second PMOS transistor PM2 may be coupled to the power supply voltage VCCQ. A gate of the second PMOS transistor PM2 may be coupled to the second node NODE2. The third node NODE3 of the bias generation circuit 133 may be coupled to the gate of the first NMOS transistor NM1 of the ESD current discharge circuit 131. In addition, the third node NODE3 of the bias generation circuit 133 may be coupled to an N-type well region of each of the first PMOS transistor PM1 and the second PMOS transistor PM2.

In an embodiment, the transistors constituting the ESD protection circuit 100, that is, the first NMOS transistor NM1, the second NMOS transistor NM2, and the third NMOS transistor NM3 that constitute the ESD current discharge circuit 131, and the first PMOS transistor PM1 and the second PMOS transistor PM2 that constitute the bias generation circuit 133 may all be manufactured using the same semiconductor fabrication process, an example of which is a process that produces line widths of 7 nm or less. Using such a process, the transistors NM1-NM3 and PM1-PM2 constituting the ESD protection circuit 100 may be configured to operate at a nominal voltage of about 1.5 V to 1.8 V. However, depending on the configuration of the internal circuit (120 in FIG. 1) or the configuration of the external circuit coupled to the pad 110, a high voltage, for example, a voltage of 3.3 V may be applied to the pad 110.

According to the ESD protection circuit 130 of the present disclosure, when the voltage of the pad 110 is triggered from a first voltage (e.g., 0 V) to a second and higher voltage (e.g., 3.3 V) or vice versa, the reliability of the transistors NM1-NM3 and PM1-PM2 constituting the ESD protection circuit 130 might not be damaged. Additionally, the reliability of the transistors NM1-NM3 and PM1-PM2 constituting the ESD protection circuit 130 may be maintained even when the voltage rises rapidly due to the ESD current flowing into the pad 110 during an ESD event.

Figure 3:
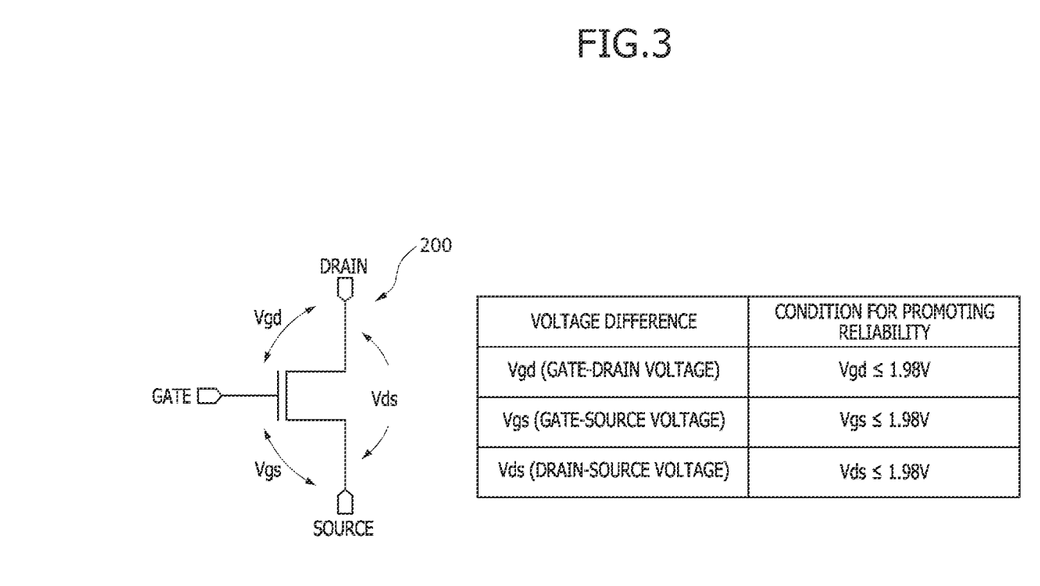
FIG. 3 is a table of conditions under which the transistors constituting an ESD protection circuit according to the present disclosure can ensure reliability.

FIG. 3 is a table of conditions under which the transistors constituting the ESD protection circuit 130 according to the present disclosure ensures reliability. As for a transistor 200 in FIG. 3, an NMOS transistor is taken as an example, but the same principle may be applied to a PMOS transistor. The description for the transistor 200 below may be applied in the same manner to the transistors NM1-NM3 and PM1-PM2 in FIG. 2.

Referring to FIG. 3, for the transistor 200 to secure reliability, a gate-drain voltage Vgd, a gate-source voltage Vgs, and a drain-source voltage Vds all need to not exceed the level of a reliability guarantee voltage. In this embodiment, the reliability guarantee voltage may be defined as the maximum voltage that can be applied between terminals of the transistor 200 without destroying the gate insulating layer of the transistor 200. In an example, the reliability guarantee voltage of the transistor 200 may be set to approximately 110% of an operation voltage. For example, when the transistor 200 has an operation voltage of 1.8 V, the reliability guarantee voltage may be set to 1.98 V. In this case, all of the gate-drain voltage Vgd, the gate-source voltage Vgs, and the drain-source voltage Vds of the transistor 200 operating at 1.8 V need to not exceed 1.98 V. When the gate-drain voltage Vgd or the gate-source voltage Vgs of the transistor 200 exceeds the reliability guarantee voltage, the gate insulating layer of the transistor 200 may be destroyed due to a strong electric field in the vertical direction of the gate insulating layer. When the drain-source voltage Vds of the transistor 200 exceeds the reliability guarantee voltage, hot carrier injection (HCL) may occur, and carriers, such as electrons, may be trapped in the gate insulating layer of the transistor 200. Accordingly, the gate insulating layer of the transistor 200 may be destroyed.

Figure 4:
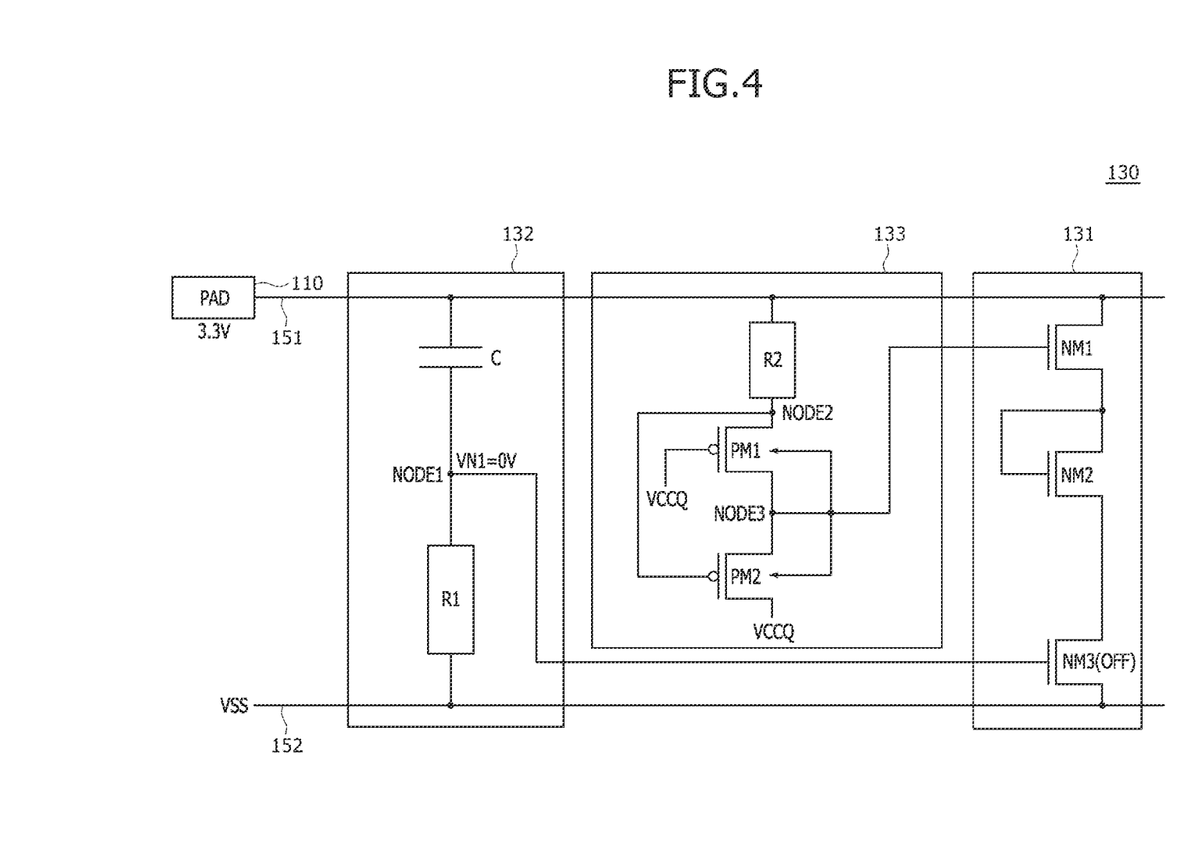
FIG. 4 is a diagram illustrating the operation of the ESD protection circuit of FIG. 2 when the electronic device of FIG. 1 performs a normal operation.

FIG. 4 is a diagram illustrating the operation of the ESD protection circuit 130 of FIG. 2 when the electronic device 100 of FIG. 1 performs a normal operation. In FIG. 4, the same reference numerals as in FIG. 2 indicate the same components.

Referring to FIG. 4, when a normal voltage of 3.3 V is applied to the pad 110, the voltage at the first node NODE1, that is, a first node voltage VN1 may be maintained at 0 V. Because the first node voltage VN1 corresponds to the gate voltage of the third NMOS transistor NM3, the third NMOS transistor NM3 may maintain a turned-off state. When the third NMOS transistor NM3 is turned off, there is no current flow path through the ESD current discharge circuit 131, regardless of whether the first NMOS transistor NM1 and the second NMOS transistor NM2 are turned on. That is, even when the first NMOS transistor NM1 and the second NMOS transistor NM2 are turned on, the space between the first voltage line 151 and the second voltage line 152 may be in an open state within the ESD current discharge circuit 131 due to the third NMOS transistor NM3 being turned off.

Accordingly, the voltage of 3.3 V applied to the pad 110 may be applied to an input and output driver of the buffer 140 of the electronic device (100 in FIG. 1) along the first voltage line 151. Although not shown in FIG. 4, even when a voltage of 0 V is applied to the pad 110, the third NMOS transistor NM3 may maintain its turned-off state according to the same principle.

Figure 5:
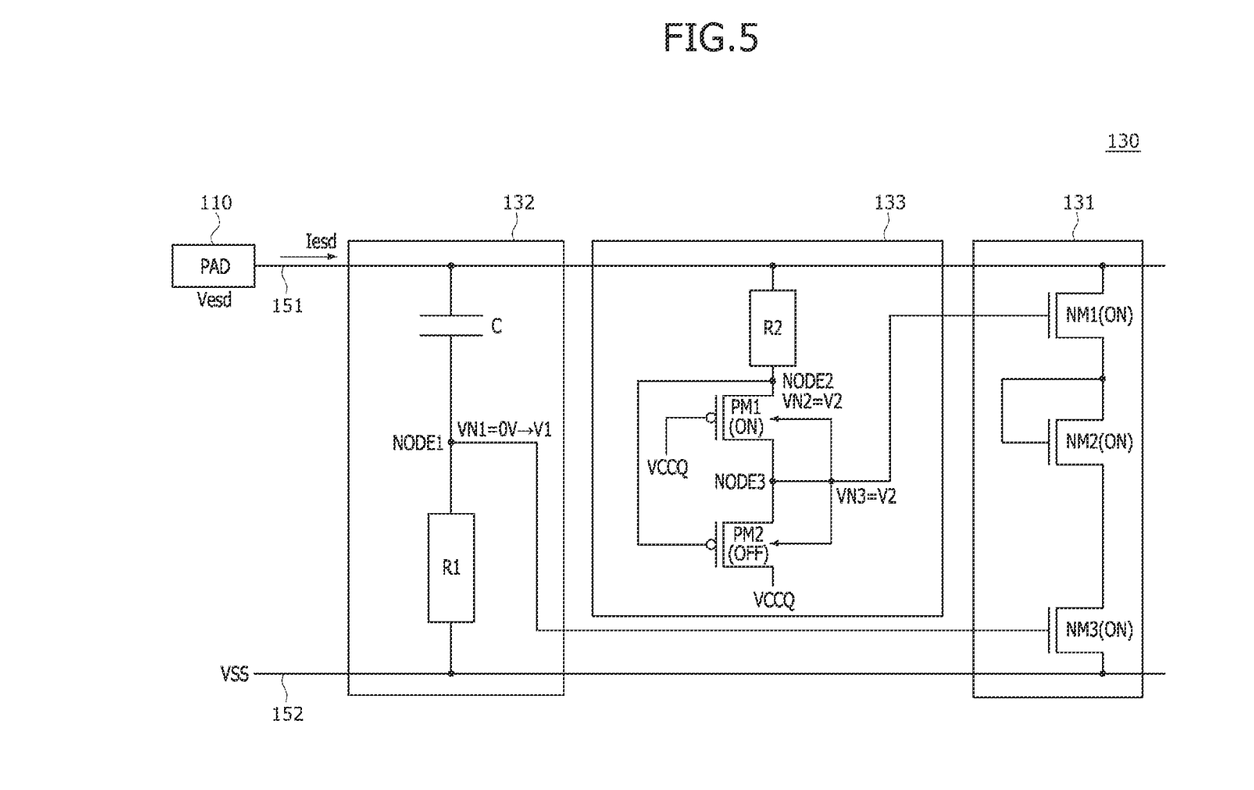
FIG. 5 is a diagram illustrating the operation of the ESD protection circuit of FIG. 2 when an ESD event occurs in the electronic device of FIG. 1.

FIG. 5 is a diagram illustrating the operation of the ESD protection circuit 130 of FIG. 2 when an ESD event occurs in the electronic device 100 of FIG. 1. In FIG. 4, the same reference numerals as in FIG. 2 indicate the same components.

Referring to FIG. 5, when an ESD event occurs, the ESD current Iesd may flow into the pad 110 and begin to flow along the first voltage line 151. Accordingly, an ESD voltage Vesd that is increased with time may be applied to the pad 110 and the first voltage line 151. Because the ESD current Iesd has a form of an alternating current (AC) until the ESD current Iesd reaches a steady-state, the capacitor C of the ESD detection circuit 132 will conduct, i.e., act as a short circuit. The voltage at the first node NODE1, that is, the first node voltage VN1 will thus go up or increase from 0 V.

When the first node voltage VN1 is increased to a first voltage V1, which turns on the third NMOS transistor NM3, the third NMOS transistor NM3 of the ESD current discharge circuit 131 may be "turned on."

The ESD current Iesd may also flow through the second resistor R2 of the bias generation circuit 133. Accordingly, when the voltage of the second node NODE2, that is, a second node voltage VN2 is increased to a second voltage V2 that turns on the first PMOS transistor PM1, the first PMOS transistor PM1 may be turned on. The magnitude of the second voltage V2 may vary depending on the magnitude of the power supply voltage VCCQ. In an example, the second voltage V2 may have a magnitude that satisfies the condition that the source-gate voltage V2–VCCQ of the first PMOS transistor PM1 is greater than the threshold voltage of the first PMOS transistor PM1. That is, the minimum value of the second voltage V2 may be less than the power supply voltage VCCQ by the threshold voltage of the first PMOS transistor PM1.

The first PMOS transistor PM1 of the bias generation circuit 133 may be turned on, while the second PMOS transistor PM2 may be turned off. Specifically, the second voltage V2, which is the second node voltage VN2, may be applied to the gate of the second PMOS transistor PM2. As the power supply voltage VCCQ, which is the source voltage of the second PMOS transistor PM2, is less than the second voltage V2, which is the gate voltage, the second PMOS transistor PM2 may be turned off.

As the first PMOS transistor PM1 of the bias generation circuit 133 is turned on and the second PMOS transistor PM2 is turned off, the voltage at the third node NODE3, that is, a third node voltage VN3 may substantially become the second voltage V2. The third voltage V2, which is the third node voltage VN3, may be provided to the gate of the first NMOS transistor NM1 of the ESD current discharge circuit 131, and the first NMOS transistor NM1 may be turned on accordingly. That is, the bias generation circuit 133 may be configured to provide a bias voltage for turning on the first NMOS transistor NM1, that is, the second voltage V2, to the gate of the first NMOS transistor NM1.

As the first NMOS transistor NM1 of the ESD current discharge circuit 131 is turned on, the source voltage of the first NMOS transistor NM1 may be increased. The increased source voltage of the first NMOS transistor NM1 may be commonly provided to the gate and drain of the second NMOS transistor NM2, and the second NMOS transistor NM2 may be turned on accordingly. As the first NMOS transistor NM1, the second NMOS transistor NM2, and the third NMOS transistor NM3 are all turned on, an ESD current discharge path may be formed from the first voltage line 151 to the second voltage line 152 within the ESD current discharge circuit 131. That is, the ESD current Iesd may be discharged from the first voltage line 151 to the second voltage line 152 through the channels of the first NMOS transistor NM1, the second NMOS transistor NM2, and the third NMOS transistor NM3.

After the first NMOS transistor NM1, the second NMOS transistor NM2, and the third NMOS transistor NM3 of the ESD current discharge circuit 131 are all turned on, the first node voltage VN1 of the ESD detection circuit 132 may no longer be increased. Accordingly, the first node voltage VN1 applied to the gate of the third NMOS transistor NM3 may also no longer be increased. As a result, the gate-source voltage, the gate-drain voltage, and the drain-source voltage of the third NMOS transistor NM3 may all be maintained within the reliability guarantee voltage range.

After the first PMOS transistor PM1 of the bias generation circuit 133 is turned on, and the first NMOS transistor NM1, the second NMOS transistor NM2, and the third NMOS transistor NM3 of the ESD current discharge circuit 131 are all turned on, the third node voltage VN3 may also no longer be increased. Accordingly, the third node voltage VN3 applied to the gate of the first NMOS transistor NM1 may no longer be increased. As a result, the gate-source voltage, the gate-drain voltage, and the drain-source voltage of the first NMOS transistor NM1 may all be maintained within the reliability guarantee voltage range. Additionally, as the third node voltage VN3 is no longer increased, the gate-source voltages, the gate-drain voltages, and the drain-source voltages of the first PMOS transistor PM1 and the second PMOS transistor PM2 may all be maintained within the reliability guarantee voltage range.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An electro-static discharge (ESD) protection circuit comprising:
   an ESD current discharge circuit including a first transistor, a second transistor, and a third transistor, connected in series and connected between a pad and a ground voltage;
   an ESD detection circuit configured to turn on the third transistor when an ESD event occurs; and
   a bias generation circuit configured to provide a bias voltage for turning on the first transistor to a gate of the first transistor when the ESD event occurs.

2. The ESD protection circuit of claim 1, wherein the first transistor, the second transistor, and the third transistor are first, second, and third N-channel type MOS (NMOS) transistors, respectively.

3. The ESD protection circuit of claim 2,
   wherein a drain of the first NMOS transistor is coupled to the pad
   wherein a source of the first NMOS transistor is coupled to a drain of the second transistor,
   wherein a gate of the first NMOS transistor is coupled to the bias generation circuit,
   wherein a source of the second NMOS transistor is coupled to a drain of the third transistor,
   wherein a source of the third NMOS transistor is coupled to the ground voltage, and
   wherein a gate of the third NMOS transistor is coupled to the ESD detection circuit.

4. The ESD protection circuit of claim 2, wherein the second NMOS transistor is turned on by a source voltage of the first NMOS transistor.

5. The ESD protection circuit of claim 4, wherein a gate and a drain of the second NMOS transistor are commonly coupled to a source of the first NMOS transistor.

6. The ESD protection circuit of claim 1, wherein the ESD detection circuit includes a capacitor and a first resistor that are connected in series to each and connected between the pad and the ground voltage.

7. The ESD protection circuit of claim 6, wherein a first node between the capacitor and the first resistor is coupled to a gate of the third transistor.

8. The ESD protection circuit of claim 1, wherein the bias generation circuit includes a second resistor connected between the pad and a second node, and
   wherein the bias voltage has substantially a same magnitude as a voltage of the second node.

9. The ESD protection circuit of claim 8, wherein the bias generation circuit further includes a fourth transistor and a fifth transistor that are connected between the second node and a power supply voltage.

10. The ESD protection circuit of claim 9, wherein the fourth transistor and the fifth transistor are a first P-channel type MOS (PMOS) transistor and a second PMOS transistor, respectively.

11. The ESD protection circuit of claim 10, wherein a gate of the first PMOS transistor is coupled to the power supply voltage.

12. The ESD protection circuit of claim 10, wherein a gate of the second PMOS transistor is coupled to the second node.

13. The ESD protection circuit of claim 10, wherein a third node between the first PMOS transistor and the second PMOS transistor is coupled to a gate of the first transistor.

14. The ESD protection circuit of claim 13, wherein the third node is coupled to an N-type well region of each of the first PMOS transistor and the second PMOS transistor.

15. The ESD protection circuit of claim 10,
    wherein a drain of the first PMOS transistor and a drain of the second PMOS transistor are coupled to a third node between the first PMOS transistor and the second PMOS transistor,
    wherein a source of the first PMOS transistor is coupled to the second node, and
    wherein a source of the second PMOS transistor is coupled to the power supply voltage.

16. An electronic device comprising:
    a pad;
    an internal circuit coupled to the pad; and
    an electro-static discharge (ESD) protection circuit configured to protect the internal circuit when an ESD event in which an ESD current flows into the pad occurs,
    wherein the ESD protection circuit includes:
    an ESD current discharge circuit including a first transistor, a second transistor, and a third transistor that are connected in series to each other and connected between the pad and a ground voltage;
    an ESD detection circuit configured to turn on the third transistor when the ESD event occurs; and
    a bias generation circuit configured to provide a bias voltage for turning on the first transistor to a gate of the first transistor when the ESD event occurs.

17. The electronic device of claim 16,
    wherein the first transistor, the second transistor, and the third transistor are first, second, and third N-channel type MOS (NMOS) transistors, respectively, and
    wherein the second NMOS transistor is triggered by a source voltage of the first NMOS transistor.

18. The electronic device of claim 16,
    wherein the ESD detection circuit comprises:
    a capacitor coupled to the pad and a first node; and
    a first resistor coupled to the first node and the ground voltage, and
    wherein the first node is coupled to a gate of the third transistor.

19. The electronic device of claim 16, wherein the bias generation circuit includes:
    a second resistor coupled to the pad and a second node to induce a voltage drop by the ESD current to provide the bias voltage; and
    a first P-channel type MOS (PMOS) transistor and a second PMOS transistor coupled to the second node and a supply voltage, respectively.

20. The electronic device of claim 19,
    wherein a drain of the first PMOS transistor and a drain of the second PMOS transistor are coupled to a third node,
    wherein a source of the first PMOS transistor is coupled to the second node,
    wherein a source of the second PMOS transistor is coupled to the supply voltage,
    wherein a gate of the second PMOS transistor is coupled to the second node, and
    wherein the third node is coupled to a gate of the first transistor.

* * * * *